United States Patent
Rolland, Jr.

[11] Patent Number: 5,492,087
[45] Date of Patent: Feb. 20, 1996

[54] VEHICLE ANTI-THEFT IGNITION DISABLING DEVICE

[76] Inventor: Roosevelt Rolland, Jr., 2281 Midway Rd. Apt. #F-47, Douglasville, Ga. 30135

[21] Appl. No.: 239,459

[22] Filed: May 9, 1994

[51] Int. Cl.$^6$ .............................. F02P 11/04; H01H 27/00
[52] U.S. Cl. .................... 123/146.5 B; 307/10.3
[58] Field of Search ...................... 123/146.5 B; 180/287; 307/10.3

[56] References Cited

U.S. PATENT DOCUMENTS

| | | | |
|---|---|---|---|
| 841,844 | 1/1907 | Bernet | 123/146.5 B |
| 1,660,675 | 2/1928 | Hemingway, Jr. | 123/146.5 B |
| 1,687,274 | 10/1928 | Watts | 123/146.5 B |
| 4,110,734 | 8/1978 | Lepore et al. | 307/10.3 |
| 4,452,197 | 6/1984 | Weber | 123/198 B |
| 4,672,224 | 6/1987 | Low | 307/10.4 |
| 4,739,736 | 4/1988 | Branco | 123/179.3 |
| 4,992,670 | 2/1991 | Pastor | 307/10.3 |

FOREIGN PATENT DOCUMENTS 15875  9/1928  Australia ..................... 123/146.5 B Primary Examiner—Tony M. Argenbright

[57] ABSTRACT

A vehicle anti-theft ignition disabling device for interrupting the ignition circuit of a vehicle for preventing its engine from being started. A terminal block has electrically conductive first and second terminals with the first terminal coupled to a positive terminal lead of an ignition circuit and the second terminal coupled to a negative terminal lead of an ignition circuit. A switch mechanism is coupled between the first and second terminals of the terminal block and actuated to a closed orientation for enabling an ignition circuit of a vehicle and actuated to an opened orientation for disabling the ignition circuit of a vehicle. A key mechanism is provided for actuating the switch mechanism to the closed orientation and actuating the switch mechanism to the opened orientation.

4 Claims, 3 Drawing Sheets

U.S. Patent    Feb. 20, 1996    Sheet 1 of 3    5,492,087
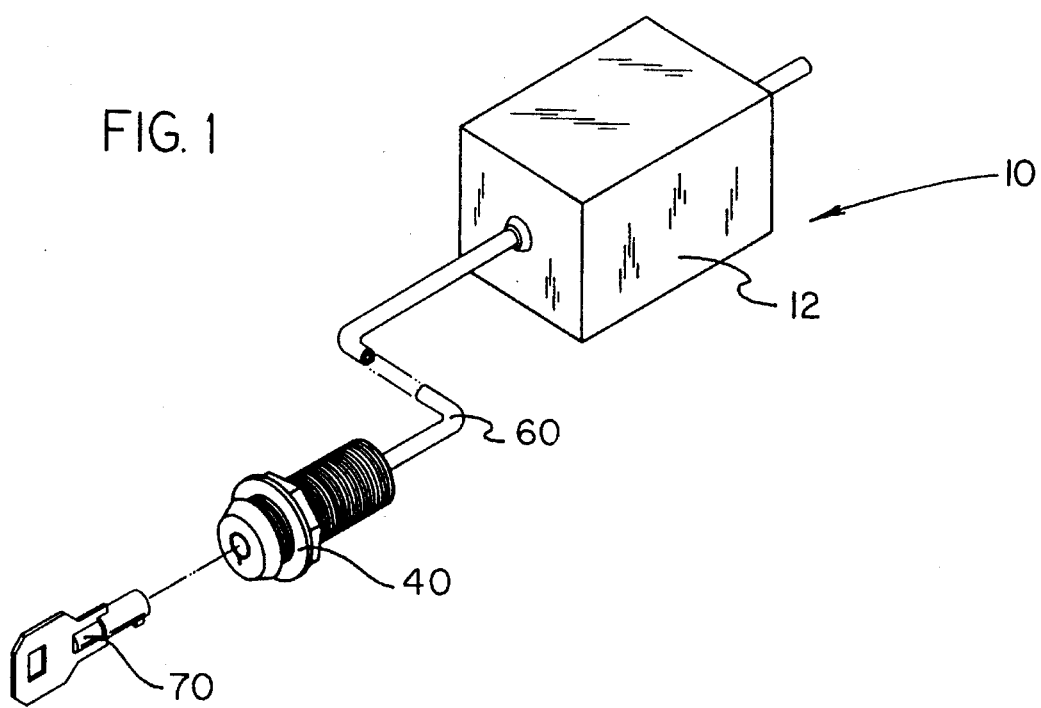
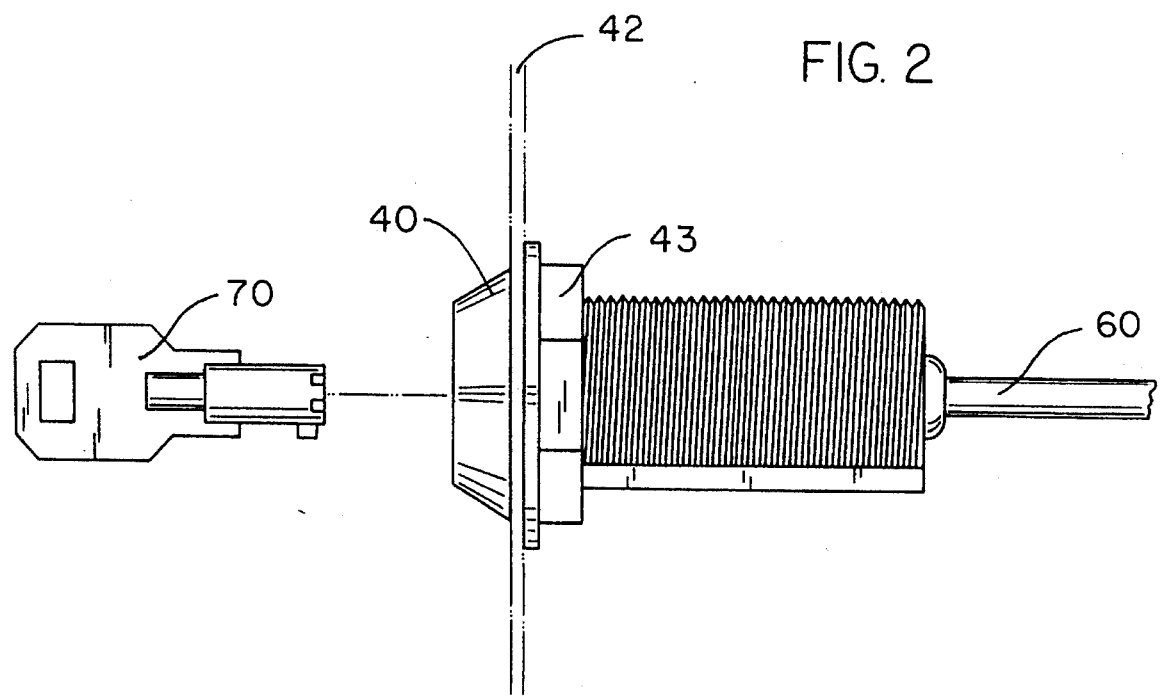

VEHICLE ANTI-THEFT IGNITION DISABLING DEVICE

BACKGROUND OF THE INVENTION

1. Field of the Invention

The present invention relates to a vehicle anti-theft ignition disabling device and more particularly pertains to interrupting the ignition circuit of a vehicle for preventing its engine from being started with a vehicle anti-theft ignition disabling device.

2. Description of the Prior Art

The use of vehicle anti-theft devices is known in the prior art. More specifically, vehicle anti-theft devices heretofore devised and utilized for the purpose of preventing a vehicle from being started are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,110,734 to Lepore et al discloses an anti-theft starting system. U.S. Pat. No. 4,452,197 to Weber discloses a vehicle anti-theft ignition foiling device. U.S. Pat. No. 4,672,224 to Low discloses a composite automatic control system for vehicle engine with theft prevention circuit. U.S. Pat. No. 4,739,736 to Branco discloses an anti-theft system for starting a vehicle. U.S. Pat. No. 4,992,670 to Pastor discloses an ignition disabling anti-theft device.

While these devices fulfill their respective, particular objective and requirements, the aforementioned patents do not describe a vehicle anti-theft ignition disabling device that is simple in design and includes a key-activated switch mechanism for enabling or disabling the ignition circuit of a vehicle.

In this respect, the vehicle anti-theft ignition disabling device according to the present invention substantially departs from the conventional concepts and designs of the prior art, and in doing so provides an apparatus primarily developed for the purpose of interrupting the ignition circuit of a vehicle for preventing its engine from being started.

Therefore, it can be appreciated that there exists a continuing need for new and improved vehicle anti-theft ignition disabling device which can be used for interrupting the ignition circuit of a vehicle for preventing its engine from being started. In this regard, the present invention substantially fulfills this need.

SUMMARY OF THE INVENTION

In the view of the foregoing disadvantages inherent in the known types of vehicle anti-theft devices now present in the prior art, the present invention provides an improved vehicle anti-theft ignition disabling device. As such, the general purpose of the present invention, which will be described subsequently in greater detail, is to provide a new and improved vehicle anti-theft ignition disabling device and method which has all the advantages of the prior art and none of the disadvantages.

To attain this, the present invention essentially comprises, in combination, a rigid, hollow, and box-shaped housing adapted to be coupled to a vehicle. A terminal block is disposed within the housing. The terminal block has electrically conductive first, second, and third terminals formed thereon with the first terminal adapted to be coupled to a positive terminal lead of an ignition circuit of a vehicle, the second terminal adapted to be coupled to a negative terminal lead of an ignition circuit of a vehicle, and the third terminal adapted to be coupled to a ground of a vehicle. A tumbler is included and has a single pole double throw switch formed therein with the switch having a first port and a second port. The tumbler is adapted to be actuated by a key in one position for allowing the switch to be placed in a closed orientation and adapted to be actuated by a key in another position for allowing the switch to be placed in an opened orientation. A cable is extended between the tumbler and the terminal block with the cable including a first wire having one end connected to the first terminal of the terminal block and the other end connected to the first port of the switch, a second wire having one end connected to the second terminal of the terminal block and the other end connected to the second port of the switch, and a third wire having one end connected to the third terminal of the terminal block and the other end connected to the tumbler. The cable further includes a tubular and armored protective sheath disposed about the wires for preventing the cable from being cut. Lastly, a key is adapted to be inserted into the tumbler with the key having one position for placing the single pull double throw switch in the closed orientation, thus enabling an ignition circuit of a vehicle, and another position for placing the single pole double throw switch in the opened orientation, thus disabling the ignition circuit of a vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle anti-theft ignition disabling device which has all the advantages of the prior art vehicle anti-theft devices and none of the disadvantages.

It is another object of the present invention to provide a new and improved vehicle anti-theft ignition disabling device which may be easily and efficiently manufactured and marketed.

It is a further object of the present invention to provide a new and improved vehicle anti-theft ignition disabling device which is of durable and reliable construction.

An even further object of the present invention is to provide a new and improved vehicle anti-theft ignition disabling device which is susceptible of a low cost of manufacture with regard to both materials and labor, and which accordingly is then susceptible of low prices of sale to the consuming public, thereby making such a vehicle anti-theft ignition disabling device economically available to the buying public.

Still yet another object of the present invention is to provide a new and improved vehicle anti-theft ignition disabling device which provides in the apparatuses and methods of the prior art some of the advantages thereof, while simultaneously overcoming some of the disadvantages normally associated therewith.

Even still another object of the present invention is to provide a new and improved vehicle anti-theft ignition disabling device for interrupting the ignition circuit of a vehicle for preventing its engine from being started.

Lastly, it is an object of the present invention to provide a new and improved vehicle anti-theft ignition disabling device comprising a terminal block having electrically conductive first and second terminals formed thereon with the first terminal adapted to be coupled to a positive terminal lead of an ignition circuit and the second terminal adapted to be coupled to a negative terminal lead of an ignition circuit; switch means coupled between the first and second terminals of the terminal block and adapted to be actuated to a closed orientation for enabling an ignition circuit of a vehicle and adapted to be actuated to an opened orientation for disabling the ignition circuit of a vehicle; and key means for actuating the switch means to the closed orientation and actuating the switch means to the opened orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment constructed in accordance with the principles of the present invention.

FIG. 2 is a side-elevational view depicting the coupling of the tumbler to a rigid surface within the driver's compartment of a vehicle with the surface preferably located under the dash or in a glove box.

The same reference numerals refer to the same parts through the various Figures.

DESCRIPTION OF THE PREFERRED EMBODIMENT

Figure 3:
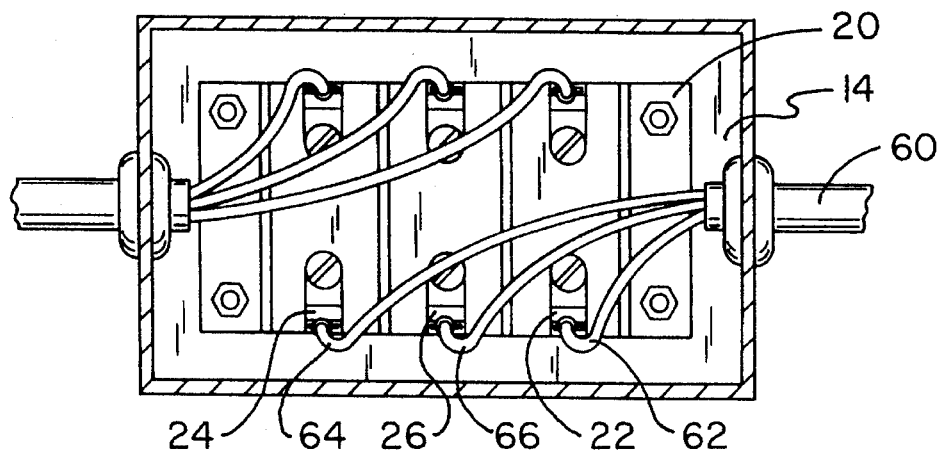
FIG. 3 is a cross-sectional view of the housing depicting the terminal block and the electrical coupling of the ignition circuit of a vehicle with the switch of the present invention.
Figure 4:
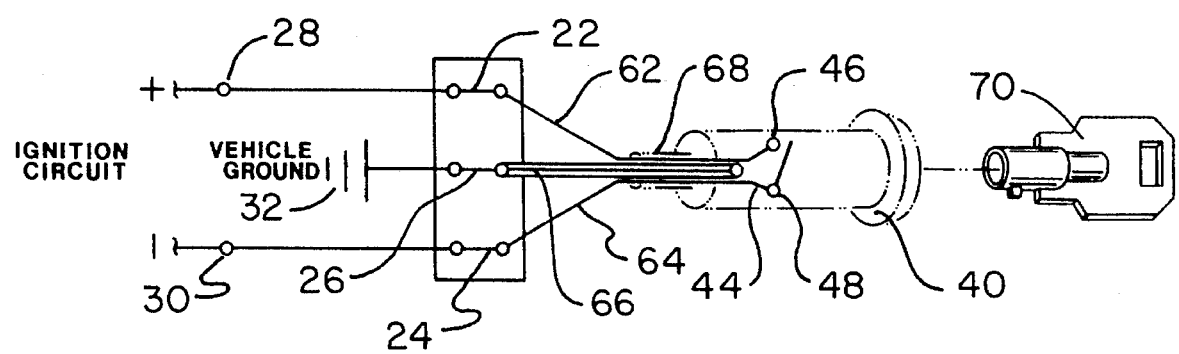
FIG. 4 is a schematic diagram of the electrical coupling between the ignition circuit of a vehicle and the present invention with the diagram further depicting the interaction of the key with the tumbler to place a switch in a closed or opened orientation.
Figure 5:
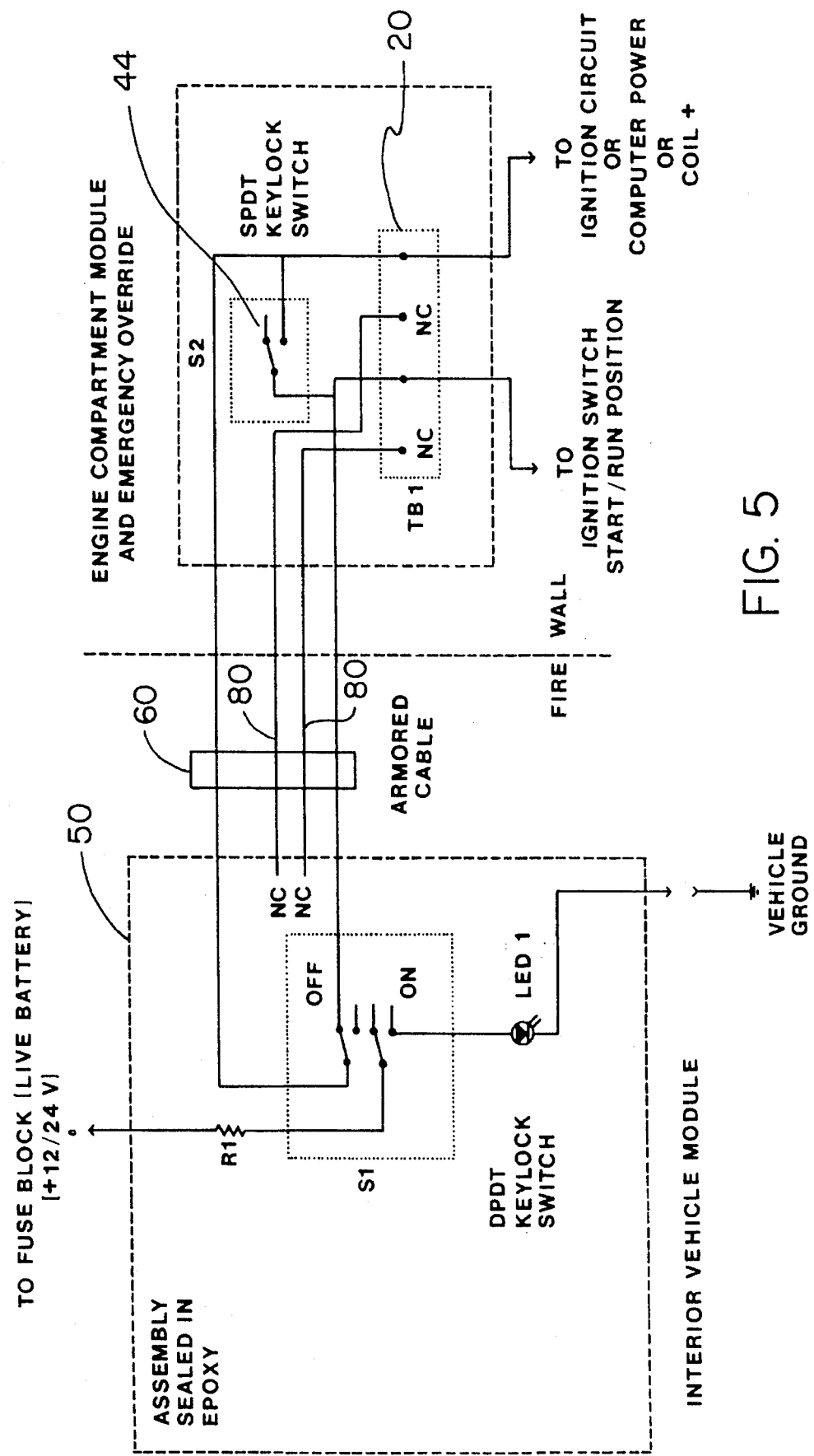
FIG. 5 is a schematic diagram of the present invention and its overall coupling and relation with the ignition circuit of a vehicle.

With reference now to the drawings, and in particular, to FIG. 1 and 4 thereof, the preferred embodiment of the new and improved vehicle anti-theft ignition disabling device embodying the principles and concepts of the present invention and generally designated by the reference number 10 will be described.

Specifically, the present invention includes five major components. The major components are the housing, terminal block, tumbler, cable, and key. These components are interrelated to provide the intended function.

More specifically, it will be noted in the various Figures that the first major component is the housing 12. The housing has a hollow interior 14 formed therein. The housing is rigid and box-shaped in structure. It is adapted to be coupled to a vehicle. Within the housing, the interface between the ignition circuit of a vehicle and the present invention is accomplished.

The second major component is the terminal block 20. The terminal block is rigid and essentially rectangular in structure. It is disposed and secured within the housing 12. The terminal block is secured to the housing with bolts extended through each corner thereof and secured with hexagonal nuts. The terminal block includes a first terminal 22, a second terminal 24, and a third terminal 26. Each terminal consists of an electrically conductive contact with two threaded screws extended therefrom for coupling with terminal leads. The first terminal of the terminal block is adapted to be coupled to a positive terminal lead 28 of an ignition circuit of a vehicle. The second terminal of the terminal block is adapted to be coupled to a negative terminal lead 30 of an ignition circuit of a vehicle. Lastly, a third terminal of the terminal block is adapted to be coupled to a ground 32 of a vehicle.

The third major component is the tumbler 40. The tumbler is rigid in structure. The tumbler has a tapered face with a threaded portion extended therefrom. The threaded portion is adapted to be disposed through a mounting surface 42 under the dashboard or in the glove box of a vehicle and then secured with a retaining nut 43. The tumbler includes a single pole double throw switch 44 formed therein. The switch has a first port 46 and a second port 48. The tumbler is adapted to be actuated by a key in one position for allowing the switch to be placed in a closed orientation for enabling an ignition circuit 50 of a vehicle. The tumbler is also adapted to be actuated by the same key in another position for allowing the switch to be placed in an opened orientation for disabling the ignition circuit of a vehicle.

The fourth major component is the cable 60. The cable is extended between the tumbler 40 and the terminal block 20. Both ends of the cable are secured to the tumbler and terminal block with grommets for preventing debris from accumulating on the terminals of the terminal block. The cable includes a first wire 62 having one end connected to the first terminal 22 of the terminal block and the other end connected to the first port 46 of the switch. The cable includes a second wire 64 having one end connected to the second terminal 24 of the terminal block and the other end connected to the second port 48 of the switch. Furthermore, the cable includes a third wire 66 having one end connected to the third terminal 26 of the terminal block and the other end connected to the tumbler 40 for providing a ground. In coupling with the terminal block, the ends of the first, second, and third wires are secured to the contacts of each terminal with the threaded screws. The cable further includes a tubular and armored metal protective sheath 68 disposed about the wires between the tumbler and the housing. The sheath is utilized for preventing an intruder from easily accessing the wires (note that if an intruder were to gain access to the wires, the ignition disabling device could be bypassed).

The fifth major component is the key 70. The key is rigid in structure and formed in a shape that is difficult to reproduce quickly. The key is adapted to be inserted into the tumbler 40. The key actuates the tumbler in one position for placing the single pole double throw switch 44 in the closed orientation. In this orientation, the ignition system of a vehicle is activated. The key also actuates the tumbler in another position for placing the single pole double throw switch in the opened orientation. In this position, the ignition system of a vehicle is de-activated.

A second embodiment of the present invention includes substantially all of the components previously described further including a plurality of inactive wires 80. These inactive wires are extended between the terminal block 20 and the tumbler 40. The wires serve as decoys for inhibiting the expedient by-pass and shorting of the switch 44 if the cable 60 is cut for obtrusive activation of the ignition circuit 50 of a vehicle.

With auto theft being one of the largest crimes in America, an inexpensive method of providing anti-theft protection was developed. An object of the present invention is to allow a simple electrical circuit to interrupt the circuit feeding the ignition or on-board computer of vehicles when a driver is away from the vehicle to prevent its engine from being started. Another object of the present invention is to allow ignition circuit interruption of marine engines while away from the vehicle.

These objectives are achieved by using an electrical switch having a key that is difficult to be duplicated to interrupt the electrical circuit to the ignition. When installed, the switch is in series with the ignition circuit. When activated, no current can flow and the engine will not start. The switch is small, allowing it to be concealed under the dash or in the glove box. Even if located by a thief, the use of armored cable makes it very difficult for the thief to cut the cable and bypass the switch. Even if cut, use of an extra wire or wires in the armored cable creates a confusion factor for the thief in that the thief will not know what wires to connect to enable the vehicle.

A non-reproducible key actuates a single pole double throw switch. The switch is attached to a mounting bracket by a nut. An armored sheath protects the wires. The wires are connected to two screws on the terminal block within the housing. The wires from the vehicle are connected to the opposing screws on the terminal block.

The feed from the automotive ignition or computer is connected to one of the terminals on the terminal block. The ignition return is connected to the other terminal on the terminal block. The third wire on the terminal block is connected to vehicle ground. When the switch is in the position shown in FIG. 4, the vehicle ignition is disabled. Inserting the key into the switch and rotating closes the switch and enables vehicle ignition.

The electrical switch and key are of the type used in home security systems and simply make and break the ignition circuit. When the key is removed the switch breaks or opens the circuit so that no current can flow and engine will not start. The switch must be so designed to break, open, or disable the circuit when the key is removed. The switch can be mounted in any suitable concealed location with or without a bracket.

The tumbler with resident switch can be mounted with a bracket or without a bracket by drilling a hole in a wall of the glove compartment in an automobile. Installation within the wall or a comparable location in a marine or other vehicle may be performed using a retaining nut. Cable is fed into the engine compartment in a length sufficient to allow placement of the terminal block and its housing near the ignition wiring system of the engine. The terminal block and housing is sealed where the cable enters with grommets.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A vehicle anti-theft ignition disabling device for interrupting the ignition circuit of a vehicle for preventing its engine from being started comprising, in combination:

a rigid, hollow, and box-shaped housing adapted to be coupled to a vehicle;

a terminal block disposed within the housing, the terminal block having electrically conductive first, second, and third terminals formed thereon with the first terminal adapted to be coupled to a positive terminal lead of an ignition circuit of a vehicle, the second terminal adapted to be coupled to a negative terminal lead of an ignition circuit of a vehicle, and the third terminal adapted to be coupled to a ground of a vehicle;

a tumbler having a single pole double throw switch formed therein with the switch having a first port and a second port, the tumbler adapted to be actuated by a key in one position for allowing the switch to be placed in a closed orientation and adapted to be actuated by a key in another position for allowing the switch to be placed in an opened orientation;

a cable extended between the tumbler and the terminal block with the cable including a first wire having one end connected to the first terminal of the terminal block and the other end connected to the first port of the switch, a second wire having one end connected to the second terminal of the terminal block and the other end connected to the second port of the switch, and a third wire having one end connected to the third terminal of the terminal block and the other end connected to the tumbler, the cable further including a tubular and armored protective sheath disposed about the wires for preventing the cable from being cut; and a key adapted to be inserted into the tumbler with the key having one position for placing the single pole double throw switch in the closed orientation, thus enabling an ignition circuit of a vehicle, and another position for placing the single pole double throw switch in the opened orientation, thus disabling the ignition circuit of a vehicle.

2. The vehicle anti-theft ignition disabling device as set forth in claim 1 further including a plurality of inactive wires each extended between the terminal block and tumbler with the wires serving as decoys for inhibiting the expedient by-pass and shorting of the switch if the cable is cut for obtrusive activation of the ignition circuit of a vehicle.

3. A vehicle ant-theft ignition disabling device for interrupting the ignition circuit of a vehicle for preventing its engine from being started comprising:

a terminal block having electrically conductive first and second terminals formed thereon with the first terminal adapted to be coupled to a positive terminal lead of an ignition circuit and the second terminal adapted to be coupled to a negative terminal lead of an ignition circuit;

a cable including a first wire coupled to the first terminal of the terminal block, a second wire coupled to the second terminal of the terminal block, and a tubular and armored protective sheath disposed about the wires for preventing the cable from being cut;

switch means coupled between the first and second wires of the cable and adapted to be actuated to a closed orientation for enabling an ignition circuit of a vehicle and adapted to be actuated to an opened orientation for disabling the ignition circuit of a vehicle; and key means for actuating the switch means to the closed orientation and actuating the switch means to the opened orientation.

4. The vehicle anti-theft ignition disabling device as set forth in claim 3 wherein the switch means is a tumbler and the key means is a key.

* * * * *